United States Patent [19]

Goodman et al.

[11] Patent Number: 4,695,511

[45] Date of Patent: Sep. 22, 1987

[54] GRANULE FOR SEPARATING ORGANIC COMPOUNDS FROM AQUEOUS LIQUIDS

[75] Inventors: Howard Goodman; Andrew R. Fugler, both of St. Austell, England

[73] Assignee: English Clays Lovering Pochin & Company, Cornwall, England

[21] Appl. No.: 675,960

[22] Filed: Nov. 27, 1984

[30] Foreign Application Priority Data

Dec. 1, 1983 [GB] United Kingdom ............... 8332174

[51] Int. Cl.$^4$ .................. B32B 5/16; C09C 1/42; C02F 1/42
[52] U.S. Cl. .................. 428/404; 428/407; 428/331; 428/492; 428/500; 428/408; 427/220; 427/221; 427/385.5; 210/680; 106/288.5; 106/DIG. 4; 106/308 N; 501/148
[58] Field of Search ............... 428/492, 403, 404, 408, 428/323, 331, 407; 427/385.5, 220; 106/DIG. 4, 308 N; 501/148

[56] References Cited

U.S. PATENT DOCUMENTS

| | | | |
|---|---|---|---|
| 4,061,582 | 12/1977 | Moschovis et al. ............ | 427/220 X |
| 4,337,294 | 6/1982 | Gunnell ............... | 428/403 |
| 4,345,003 | 8/1982 | Matsushima et al. ............ | 428/403 |
| 4,378,408 | 3/1983 | Joedicke ............... | 428/403 |
| 4,474,852 | 10/1984 | Craig ............... | 428/403 |

FOREIGN PATENT DOCUMENTS

| | | | |
|---|---|---|---|
| 725071 | 1/1966 | Canada ............... | 427/220 |
| 967678 | 8/1964 | United Kingdom ............... | 427/220 |

*Primary Examiner*—P. C. Ives
*Attorney, Agent, or Firm*—Stefan J. Klauber

[57] ABSTRACT

A granule comprises an inner core, which is formed from a material which does not expand appreciably in the presence of organic compounds, and an outer shell formed from an organo-clay which is preferably held on the inner core with the aid of a binder.

The granule can be prepared by tumbling a particle of the inner core material in admixture with a powdered organo-clay and a binder therefor. A particulate bed of the granules can be used for separating organic compounds from a mixture thereof with an aqueous medium.

11 Claims, No Drawings

GRANULE FOR SEPARATING ORGANIC COMPOUNDS FROM AQUEOUS LIQUIDS

BACKGROUND OF THE INVENTION

This invention relates to the separation of organic compounds from aqueous liquids.

U.S. Pat. No. 2,367,384 describes a process for selectively removing small immiscible amounts of organic oily impurities from water by contacting water containing said impurities with an inert solid having a relatively large surface area and having deposited thereon a cationic surface active bonding agent for said solid and for said impurities, and separating the water from the mixture thus formed, said cationic surface active bonding agent being selected from the group consisting of primary, secondary and tertiary organic amines and quaternary ammonium, phosphonium, arsonium, stibonium and ternary sulfonium organic compounds having at least one aliphatic radical containing at least 8 carbon atoms.

It is also known to separate organic compounds from water by a method in which a mixture of water and the organic compounds is allowed to flow through a column composed of granules of a clay which has been treated with a material which renders the surface of the clay hydrophobic and oleophilic, such a treated clay generally being known as an organophilic cation-modified clay or, briefly, as an "organo-clay" (see British Patent Specification No. 664,830). The clay used as a starting material for preparing an organo-clay is usually selected to provide a high degree of absorbency, and clays of the smectite class, such as montmorillonite, bentonite, hectorite and saponite are most suitable for this purpose. The material used to treat the surface of the clay generally comprises molecules which have both polar, or hydrophilic, groups for effective bonding with the hydrophilic clay surface and non-polar, or oleophilic groups, which will form bonds with the organic impurities which are to be removed. Material which have been found to be particularly suitable for this purpose include primary, secondary and tertiary amines and quaternary ammonium compounds, which contain a hydrocarbon radical having at least 8, and, preferably from about 10 to about 24, carbon atoms.

SUMMARY OF THE INVENTION

According to one aspect of the present invention there is provided a granule formed from an inner core of a material which does not expand appreciably in the presence of organic compounds, and an outer shell of an organo-clay.

It has been found that a disadvantage of known organo-clays is that the outer layers of each granule tend to become fully saturated with absorbed organic compounds before the absorption capacity of the center of the granule has been fully utilised, because the fine interconnecting pores within the granule are not easily penetrated by droplets of oil or by relatively large organic molecules. As a result a significant proportion of the total volume of available absorbent material is effectively wasted. Moreover, the rate at which a mixture to be separated can be passed through a column of organo-clay granules is governed by the rate at which organic impurities can be absorbed so that, as sites available for the absorption of organic impurities become progressively filled the rate of absorption decreases and for this reason the throughput rate of the mixture decreases. A granule in accordance with the invention overcomes this problem.

The material of the inner core of the granules of the present invention, as well as being resistant to swelling in the presence of organic compounds, should also preferably have good mechanical strength and resistance to crushing and abrasion: examples of suitable materials for the inner core are coke, coal and certain siliceous and aluminosiliceous materials. We have found that fine grains of sand or anthracite are especially suitable for this purpose. The use of coke or coal as the material for the inner core has the advantage that the granules, after absorbing the organic compounds, can be disposed of by burning.

The outer shell of the granules of the present invention is formed from a smectite clay, such as bentonite, montmorillonite, Fuller's earth, hectorite, saponite and the like, which has been treated with a material which renders the surface of the clay hydrophobic and oleophilic. Satisfactory results are obtained when the smectite clay is treated with a cationic organic compound, preferably a primary, secondary or tertiary amine or a quaternary ammonium compound, which contains a hydrocarbon radical containing at least 8, and preferably from about 10 to about 24 carbon atoms.

Advantageously, the outer shell of the granule is held on the inner core with the aid of a binder.

The granules of the invention can be formed by a process in which grains of the core material are subjected to a tumbling action in a powdered organo-clay in the presence of a binder which is usually dispersed in water. The binder can be, for example, a latex of a natural or synthetic rubber, but other adhesive materials may be used, for example a polyvinyl acetate or phenol formaldehyde adhesive. Generally there is used from 0.5 to 10.0% by weight of dry binder solids based on the weight of dry organo-clay.

According to another aspect of the present invention there is provided a method for separating one or more organic compound from a mixture thereof with an aqueous medium, which method comprises passing the mixture through a particulate bed which comprises granules in accordance with the invention.

In the method of the invention the aqueous medium will in most cases be water. The organic compounds may be soluble in water as is the case, for example, with humic acids and their derivatives, or they may be insoluble in water in which case they will be present in the form of a suspension or an emulsion. Organic compounds which frequently occur in effluent water to be purified include halogenated and unhalogenated hydrocarbons and phenols and pesticides and herbicides. When the organic compounds to be separated from the aqueous medium is an oil it is preferable to employ a particulate bed of which from 2% to 25% by weight consists of composite granules according to the invention with the remainder comprising an inert sand.

EMBODIMENTS OF THE INVENTION

The invention is illustrated by the following Examples.

EXAMPLE 1

A batch of composite granules in accordance with the invention was formed by tumbling grains of sand with an organo-clay powder in the presence of water containing a styrene-butadiene rubber adhesive. 1 kg of sand which had been graded so that it consisted of grains which passed through a No. 16 mesh British Standard sieve (nominal aperture 1.000 mm) and were retained on a No. 30 mesh British Standard sieve (nominal aperture 0.500 mm) was sprayed with 150 g. of a diluted latex emulsion which had been formed by diluting a latex of styrene butadiene rubber, which originally contained 50% by weight of solids, with water until the solids content was 5% by weight. The latex-treated sand was then contacted in a pan-type pelletiser with 374 g of an organo-clay powder which comprised Wyoming sodium bentonite treated with a quaternary ammonium compound which can be represented by the chemical formula:

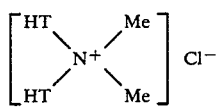

wherein Me represents a methyl group and HT represents a hydrocarbon group derived from hydrogenated tallow which comprises a mixture of hydrocarbon radicals having from 14 to 20 carbon atoms but in which the octadecyl radical predominates. (A typical analysis of the hydrocarbon radicals contained in hydrogenated tallow is:- $C_{14}$ 2.0%; $C_{15}$ 0.5%; $C_{16}$ 29.0%; $C_{17}$ 1.52%; $C_{18}$ 66.0% and $C_{20}$ 1.0%). The quantity of styrene-butadiene rubber adhesive was 2% by weight based on the weight of dry organo-clay. The composite granules after sieving to separate from surplus organo-clay powder had sizes predominantly in the range of from 1.0 mm to 2.0 mm and consisted approximately of 75% by weight of sand and 25% by weight of organo-clay.

A small glass column was filled with a blend of 5% by weight of composite granules formed as described above and 95% by weight of uncoated sand consisting predominantly of grains in the size range from 0.5 mm to 1.0 mm. An emulsion of oil in water was prepared by adding a few drops of light lubricating oil to a large quantity of hot water and subjecting the resulting mixture to intense agitation in a high speed shrouded impeller mixer for 15 minutes. 4 liters of this emulsion at a temperature of 70° C. were passed through the column and the proportion by weight of oil in the emulsion before and after passage through the column and the weight in grams of oil retained per gram of organo-clay when the organo-clay was saturated were measured.

As a control, a 4 liter batch of a similar oil in water emulsion at 70° C. was passed through a similar column filled with a blend of 5% by weight of granules composed only of the organo-clay and 95% by weight of the same uncoated sand. The proportion by weight of oil in the emulsion before and after passage through the column and the weight in grams of oil retained per gram of organo-clay when saturated were measured.

The results obtained are set forth in Table 1 below:-

TABLE 1

| Type of granule | Proportion by weight of oil in emulsion (ppm) entering column | Proportion by weight of oil in emulsion (ppm) leaving column | % by weight of oil removed | g. of oil retained per g. of organo-clay when saturated |
| --- | --- | --- | --- | --- |
| Composite | 67 | 6 | 91 | 4.0 |
| Organo-clay | 101 | 13 | 87 | 0.7 |

TABLE 1-continued

| Type of granule | Proportion by weight of oil in emulsion (ppm) entering column | Proportion by weight of oil in emulsion (ppm) leaving column | % by weight of oil removed | g. of oil retained per g. of organo-clay when saturated |
| --- | --- | --- | --- | --- |
| only | | | | |

Note:
"ppm" means parts by weight per $10^6$ parts by weight of emulsion.

It will be seen that the composite granules removed approximately the same proportion of the oil originally present in the emulsion as did the granules consisting of organo-clay only but, since the composite granules comprised only 25% by weight of organo-clay, the weight of oil retained per unit weight of organo-clay when saturated was very much greater in the case of the composite granules. Also, each gram of composite granules removes over one gram of oil.

EXAMPLE 2

A small glass column was filled with composite granules prepared as described in Example 1. A batch of peaty water containing dissolved humic acid materials was passed through the column and the optical transmission of the water before and after passage through the column was measured using ultraviolet light of wavelength 360 nm in a Pye Unicam ultraviolet/visible spectrophotometer.

The experiment was then repeated but using in place of the composite granules (a) granules of the organo-clay and (b) granules of an activated carbon of sizes in the range of from 0.42 mm to 1.4 mm, the activated carbon being formed by fluidised bed steam activation of Welsh anthracite.

The results obtained are set forth in Table II below:-

TABLE II

| Type of granule | Optical transmission at 360 nm of water (%) entering column | Optical transmission at 360 nm of water (%) leaving column |
| --- | --- | --- |
| Composite | 42 | 91 |
| Organo-clay only | 42 | 76 |
| Activated carbon | 42 | 62 |

Note:
The optical transmission of pure water is 100%.

The reason for the clear superiority of the composite granules in decoloring peaty water is believed to be that the granules of organo-clay only are formed by compression to give them sufficient strength while the composite granules are formed by rolling adhesive-treated core granules in powdered organo-clay. As a result the organo-clay outer layer of the composite granules is more porous than the granules of organo-clay only and therefore offers less resistance to the diffusion of relatively large organic molecules to adsorption sites within the body of the layer.

A further disadvantage of granules consisting of organo-clay only is that diffusion of large organic molecules within the body of the organo-clay is relatively slow and an appreciable time is therefore taken for an organic molecule to reach the center of a granule. This means that the velocity of flow of the mixture of organic compounds and polar liquid must be limited if the organic molecules are to reach the center of the granules. The choice must be made between passing the mixture through the bed of granules at a relatively low throughput rate and utilising the centers of the granules or increasing the throughput rate and wasting the centers of the granules. This disadvantages is effectively overcome by using composite granules in accordance with the invention.

What is claimed is:

1. A granule useful for separating organic substances from an aqueous medium comprising an inner core, which is formed from a material that does not expand in the presence of organic compounds, and is selected from the group consisting of carbonaceous, siliceous and alumino-siliceous materials, and an outer shell formed from an organophilic cation-modified clay.

2. A granule as claimed in claim 1, wherein the material of the inner core has suitable mechanical strength and resistance to crushing and abrasion.

3. A granule as claimed in claim 1, wherein the material of the inner core is a coke, a coal, or a sand.

4. A granule as claimed in claim 1, wherein the organophilic cation-modified clay of the outer shell of the granule is formed from a smectite clay which has been treated with a material which renders the surface of the clay hydrophobic and oleophilic.

5. A granule as claimed in claim 1, wherein the outer shell is held on the inner core with the aid of a binder.

6. A granule as claimed in claim 5, wherein the binder is a latex of a natural or synthetic rubber.

7. A granule useful for separating organic substances from an aqueous medium comprising an inner core which is formed from a material selected from the group consisting of a coke, a coal and a sand, and an outer shell which comprises an organophilic cation-modified clay and a binder therefor.

8. A granule as claimed in claim 7, wherein said organophilic cation-modified clay is a bentonite which has been treated with a quaternary ammonium compound represented by the chemical formula:

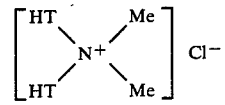

in which Me represents a methyl group and HT represents a hydrocarbon group derived from a hydrogenated tallow.

9. A granule as claimed in claim 7, wherein the granule has a size in the range of from 1.0 mm to 2.0 mm.

10. A process for preparing a granule as claimed in claim 1, which process comprises tumbling grains of said core material in admixture with a powdered organophilic cation-modified clay and a binder therefor.

11. A process according to claim 10, in which the binder is a latex of a natural or synthetic rubber.